(12) United States Patent
Pilloy

(10) Patent No.: US 7,833,592 B2  
(45) Date of Patent: Nov. 16, 2010

(54) GLAZING PANEL

(75) Inventor: Georges Pilloy, Jumet (BE)

(73) Assignee: AGC Glass Europe, Brussels (BE)

( * ) Notice: Subject to any disclaimer, the term of this patent is extended or adjusted under 35 U.S.C. 154(b) by 886 days.

(21) Appl. No.: 10/566,049

(22) PCT Filed: Jul. 27, 2004

(86) PCT No.: PCT/EP2004/051611

§ 371 (c)(1), (2), (4) Date: Jan. 26, 2006

(87) PCT Pub. No.: WO2005/012202

PCT Pub. Date: Feb. 10, 2005

(65) Prior Publication Data

US 2008/0026166 A1    Jan. 31, 2008

(30) Foreign Application Priority Data

Jul. 30, 2003  (EP) ................................. 03102342  
Oct. 13, 2003  (EP) ................................. 03103775

(51) Int. Cl.  
*E06B 3/00* (2006.01)  
*E04C 2/54* (2006.01)  
*G09G 3/19* (2006.01)  
*G02F 1/15* (2006.01)  
*C03C 27/00* (2006.01)

(52) U.S. Cl. ........................... 428/34; 359/265; 345/49; 156/107; 156/109; 52/786.13

(58) Field of Classification Search ................. 428/34; 52/786.1, 786.13; 156/107, 109; 359/265, 359/272; 345/49  
See application file for complete search history.

(56) References Cited

U.S. PATENT DOCUMENTS

| | | | | |
|---|---|---|---|---|
| 4,362,771 A * | 12/1982 | Umeda et al. | ................ | 428/1.6 |
| 5,009,218 A * | 4/1991 | Bachli | ................ | 126/714 |
| 5,855,638 A * | 1/1999 | Demars | ................ | 65/34 |
| 6,429,961 B1 * | 8/2002 | Harary et al. | ................ | 359/296 |
| 6,662,523 B2 * | 12/2003 | Hornung et al. | ........ | 52/786.13 |
| 6,689,241 B1 | 2/2004 | Delhorme et al. | | |
| 2003/0112489 A1 | 6/2003 | Ash et al. | | |
| 2004/0081775 A1 | 4/2004 | Martin et al. | | |

FOREIGN PATENT DOCUMENTS

| | | |
|---|---|---|
| EP | 0740186 | 10/1996 |
| EP | 0782037 | 11/1996 |
| GB | 2102977 | 2/1983 |

* cited by examiner

*Primary Examiner*—Donald Loney  
(74) *Attorney, Agent, or Firm*—Oblon, Spivak, McClelland, Maier & Neustadt, L.L.P.

(57) ABSTRACT

This invention relates to glazing panels, and in particular to chromogenic glazing panels and to a process for manufacturing such glazing panels. It is disclosed a glazing panel comprising two sheets of glass spaced apart from each other and sealed together along a of their edges, wherein the distance between the two sheets of glass is between 10 and 500 μm and wherein the glazing panel is provided with a plurality of spaced deposits arranged between and in contact with the two sheets of glass and arranged with a distance between the deposits of between 1 and 10 cm, at least some of the deposits being attached to the surface of each glass sheet and each deposit comprising an adhesive. The glazings according to the invention have the advantage of providing a substantially constant distance between the two sheets of glass over substantially the whole surface of the glazing panel.

25 Claims, 1 Drawing Sheet

GLAZING PANEL

CROSS-REFERENCE TO RELATED APPLICATIONS

This is the U.S. National Stage of PCT/EP2004/051611 filed 27 Jul. 2004, which claims priority from European Patent Application No. 03102342.7 filed 30 Jul. 2003 and European Patent Application No. 03103775.7 filed 13 Oct. 2003, each of which is hereby incorporated by reference.

BACKGROUND OF THE INVENTION

This invention relates to glazing panels, and in particular to chromogenic glazing panels and to a process for manufacturing such glazing panels.

Although the invention is described herein with particular reference to suspended particles devices (SPDs) it will be understood that it has applications to other chromogenic glazing panels and to other glazing panels, for example electrochromic glazing panels and vacuum insulating glazings. Glazing panels according to the invention may have various applications: they may be used as architectural products, for example they may be incorporated in windows, in double or multiple glazing units and in doors; or as products for the automotive industry, for example as rear-view mirrors, sun-roofs or automotive windows.

Chromogenic technologies may offer a dynamic control over the opto-energetic characteristics of a glazing. Chromogenic technologies include electrochromic devices (ECDs), reflective hydrides, liquid crystals, suspended particle devices (SPDs), photochromics and thermotropics. Electrochromic and suspended particle devices undergo a reversible change in optical properties upon application of an electrical voltage, photochromic materials darken under the direct action of sunlight and thermotropic (or thermochromic) materials respond to heat. Liquid crystals windows switch quickly from a transparent state to a diffuse white state and reflective hydrides switch to a reflective state. Glazing panels which can in this way dynamically control light transmission are also called "smart windows".

Suspended particle devices are conventionally made using two sheets of glass, spaced apart from each other and sealed together along their edges, the glass sheets being coated with a conductive layer on their surface facing the space between them. The space between the two glass sheets is filled with a functional material which may be a liquid, a gel or a resin comprising suspended particles. The suspended particles may be comprised in a film sandwiched between the glass sheets. When an electrical voltage is applied to the conductive layers, a change in the luminous transmission of the glazing panel is observed. In electrochromic devices, the functional material between the two glass sheets generally comprises an electrochromic electrode, a counter-electrode and between both electrodes, an ion conductor. The ion conductor may be a liquid, a gel, a polymer or a ceramic conductor.

To obtain a good quality SPD wherein the suspended particles are comprised in a liquid, a gel or a resin, it is necessary that the space between the two sheets of glass be as constant as possible. However, the larger the glazing panel, the more the space between the two glass sheets may vary in an uncontrollable manner due to deformation of the glass sheets. For the same reason, i.e. the resistance to deformation of the glass sheets, the thickness of the glass sheets has an influence on the constancy of the space between the two sheets of glass. Furthermore, when filling the space between the two sheets of glass with a functional material comprising suspended particles, this material has a tendency of pushing the two glass sheets away from each other, thereby also providing unacceptable differences in the distance between the two sheets of glass, at different portions of the glazing panel.

SUMMARY OF THE INVENTION

According to one of its aspects, the present invention provides a glazing panel as defined by claim 1. Other claims define preferred and/or alternative aspects of the invention.

Glazing panels according to the invention preferably present a distance between the two sheets of glass substantially constant over substantially the whole surface of the glazing panel. This substantially constant distance may be maintained by means of spaced deposits arranged with a distance between the deposits of preferably between 1 and 10 cm. The deposits preferably comprise an adhesive, or alternatively, consist essentially of an adhesive, or consist of an adhesive. The adhesive nature of the deposits and the spacing between them are such that they may prevent the two glass sheets from moving closer to each other and/or from moving apart from each other. Examples of convenient adhesives are UV-cured adhesives (for example WELLOMER UV 2086, DELO-PHOTOBOND 4496, LOCTITE 350 UN), anaerobic cured adhesives (for example DELO-ML) or heat cured adhesives (for example DELO-MONOPOX). Coloured adhesives may be used, especially in SPDs where the functional material is coloured; coloured glass or glass laminated with a coloured PVB may be used, particularly in this latter case. Alternatively, adhesives able to change optical properties upon application of an electric voltage may be used. Such coloured or chromogenic adhesives may provide an aesthetic advantage.

The glass sheets may be sealed together along their edges according to various known techniques with known material, but preferably, the material used for sealing the glass sheets together is the same as the material used for the deposits. This may facilitate the process as a single material may be used on the production line.

The invention may advantageously be applied to glazing panels having a size greater than 30×30 cm. Previously, it was generally problematic to keep a substantially constant distance between the two glass sheets of a SPD other than when the glazing panel was small, in particular less than 30×30 cm. The present invention may provide a substantially constant distance between the two glass sheets of glazing panels whatever their size, and in particular when their size is larger than 30×30 cm. When talking herein of a glazing panel larger than 30×30 cm, it should be understood that at least one dimension of the glazing panel is greater than 30 cm. Glazing panels of for example 40×50 cm, 20×60 cm, or 45×15 cm are larger than 30×30 cm. The glazing panel may be larger than 40×40 cm, 50×50 cm or 60×60 cm.

In a preferred embodiment, the thickness of each of the two sheets of glass is in the range 2 to 6 mm, preferably 3 to 5 mm, and is more preferably of the order of 4 mm. Due to the deformation of the glass sheets, especially at thicknesses up to 6 mm, it was previously difficult to maintain a constant distance between two such sheets of glass in known structures. The present invention advantageously allows maintenance of a substantially constant distance between two glass sheets having thicknesses in the range 2 to 6 mm. The two sheets of glass may be of the same thickness or have different thicknesses.

The distance between the two sheets of glass may be between 10 and 500 µm, or 15 and 500 µm. Preferably, the distance between the two sheets of glass is between 10 and 250 µm or 10 and 100 µm or 15 and 100 µm or more preferably, between 20 and 200 µm. Still more preferably, the distance between the two sheets of glass is between 50 and 150 µm. These values of distance between the two sheets of glass may be preferred for a good working of the chromogenic glazing panel. In the case of vacuum insulating glazings, preferred distance may be between 100 and 500 µm. Various techniques may be used to maintain the sheets of glass spaced apart. Microbeads may be present in the adhesive, those microbeads having a diameter substantially equal to the distance desired between the sheets of glass. The adhesive may have a mechanical resistance adapted and sufficient to maintain the sheets of glass spaced apart, so that a predetermined quantity of adhesive allows maintenance of the desired distance between the two glass sheets. Alternatively, the adhesive may be deposited in two steps: during a first step, part of the deposits (for example, one deposit in two) are placed on one of the glass sheet and are allowed to dry without constraint. The quantity of adhesive forming these deposits may be calculated according to the desired distance between the glass sheets; in a second step, when the first deposits are dried, the other deposits are deposited and the second glass sheet is placed over the first glass sheet with the deposits. In this case, the first set of deposits may be useful to help prevent the two spaced sheets of glass moving together and the second set of deposits may be useful to help prevent the two sheets of glass moving apart.

Advantageously, the variation of distance between the two sheets of glass over substantially the whole surface of the glazing panel may be less than 20% of the average distance between the two sheets of glass, and preferably the variation of distance between the two sheets of glass may be in the range 0 to 10% of the average distance between the two sheets of glass. This is to say that if the average distance between the two sheets of glass is "d", the effective distances measured in different points over the main portion of the glazing panel are preferably comprised between d+20% and d−20%. The average distance between the two sheets of glass as defined and used herein is measured by measuring the effective distance between the two sheets of glass in different points of the glazing panel and by calculating the mean value of these measurements. These points of measurement should cover at the best the entire surface of the glazing panel and be numerous enough so as to provide a statistically meaningful average value. Preferably, the number of measurements is at least equal to 25 times the surface of the glazing panel expressed in $m^2$ and the measurements are made at the central point of imaginary squares dividing the glazing panel surface in equal smaller surfaces. The spacing between the two glass sheets may be measured with the help of a set of gauges. The measurement of the spacing between the two glass sheets when used, for example in a SPD, may also be assessed by observing the variation in colour and/or luminous transmission of different portions of the glazing panel. Preferably, there should be no or no substantial variation of colour and/or light transmission observable. Still preferably, the variation in luminous transmission should not exceed 10%, more preferably it should not exceed 5%.

The deposits may be arranged linearly or in alternate rows. Alternatively, they may be arranged without any particular organisation or be more numerous in one portion of the glazing panel and less in another, for example they may be less numerous in the central vision portion of the glazing panel. The distance between the deposits is preferably equal or greater than 1, 2, 3 or 4 cm and equal or less than 10, 8, or 6 cm, more preferably between 1 and 10 cm and still more preferably between 4 and 6 cm. Such ranges of distances between the deposits may provide glazing panels with a substantially constant distance between the two sheets of glass. By "distance between the deposits" it is meant herein the distance between at least 50% of the deposits, or preferably between at least 75% of the deposits, or still more preferably, the distance between all of the deposits. This means that at least 50% of the deposits do not have another neighbouring deposit inside a circle of which they are the central point and which has a radius equal to the distance between the deposits.

The surface of each of the two sheets of glass facing the space between them may be coated with a conductive layer. The space between the two sheets of glass may comprise a liquid, a gel or a resin comprising suspended particles. A SPD may so be provided, which when a voltage is applied to the conductive layers, presents a change in its luminous transmission value. The conductive coatings may be deposited by known techniques such as vacuum deposition or chemical vapour deposition. Examples of convenient conductive coatings are ITO coatings, or doped $SnO_2$ coatings. The space between the two sheets of glass may not be entirely filled with a liquid, gel or resin comprising suspended particles, and so only a portion of the glazing panel may show chromogenic properties.

A process of manufacturing a glazing panel according to the present invention may comprise the steps of positioning the deposits on one face of one of the glass sheet, placing the other glass sheet over the first one and the deposits, sealing together both glass sheets along their edges. The sealing step may be entirely carried out after the two glass sheets have been placed together, but it may also be carried out before. In this case, a rim of adhesive may be positioned all around the first glazing panel next to its borders, during the step of positioning the deposits, before placing the second sheet of glass over the first one. When manufacturing a chromogenic glazing panel, one edge of the glazing panel may not be sealed or be sealed with capillary tubes through the sealing, and the liquid or resin may subsequently be inserted or let to flow into the glazing panel. Then the last edge or the capillary tubes may be sealed.

BRIEF DESCRIPTION OF THE DRAWINGS

Embodiments of the invention will now be described, by way of examples only, with reference to FIGS. 1 and 2, and to example 1.

DETAILED DESCRIPTION

Figure 1:
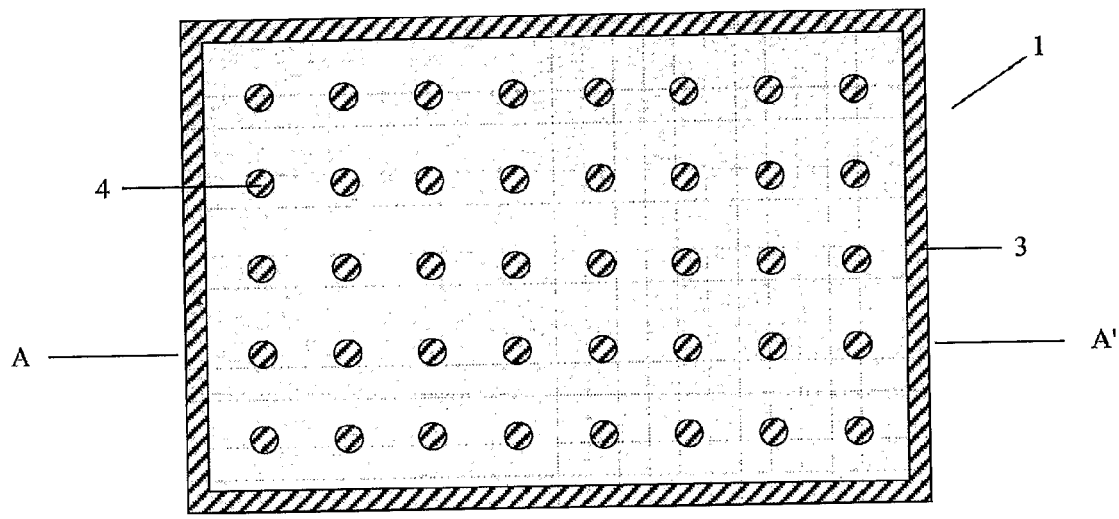
FIG. 1 shows a glazing panel according to the present invention.
Figure 2:
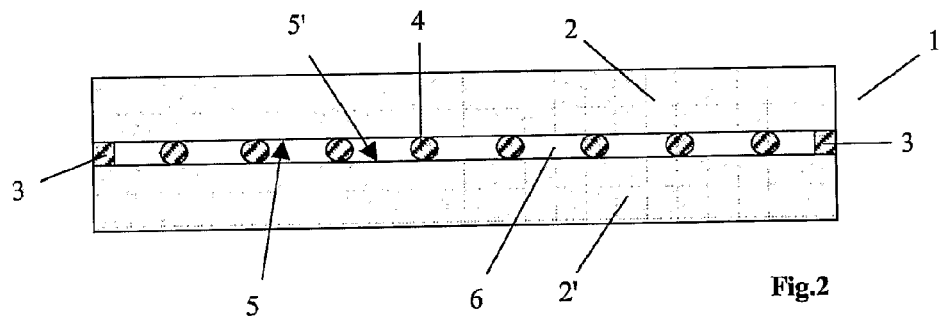
FIG. 2 shows a transversal view through the glazing panel of FIG. 1 along line A-A'. For a better understanding of the drawings, these are not drawn to scale.

FIGS. 1 and 2 show a glazing panel 1 comprising two sheets of glass 2 and 2' spaced apart from each other and sealed together along all of their edges with a sealing material 3. The glazing panel is provided with a plurality of spaced deposits 4 arranged between and in contact with the two sheets of glass 2 and 2'. In these figures, the deposits are arranged linearly and form an array of deposits with a regular interval between them. The surfaces 5 and 5' of the two sheets of glass 2 and 2' are provided with a conductive coating. The sealed space 6 between the two sheets of glass 2 and 2' may be filled with a liquid, gel or resin comprising suspended particles so as to form a SPD.

Example 1

Two sheets of glass of 4 mm thickness with a dimension of 1×1 m are provided with a conductive coating. The coating consists of a layer of $SiO_xC_y$ of 750 Å further coated with a layer of $SnO_2$:F of 3200 Å. Deposits of an UV-cured adhesive, sold under the name WELLOMER UV 2086, are deposited on the coated side of the first sheet of glass, linearly in an array, with a regular interval between the deposits of 5 cm. The second sheet of glass is then positioned over the first one with the deposits, its coated side facing the deposits and gently pressed until reaching the desired distance between both glass sheets, i.e. in this case 100 µm. This assembly is then let to dry a few minutes under an UV-lamp. The deposits thus present a height of 100 µm, corresponding to the spacing between the glass sheets, and a diameter measured in the plane parallel to the glass sheets of 1 mm.

In a following step, three edges of the assembly are sealed with the same adhesive WELLOMER UV 2086. After drying of the sealing (a few minutes under an UV-lamp), a suspension comprising suspended particles is allowed to flow between the glass sheets and the fourth edge of the glazing panel is sealed and let to dry a few minutes under an UV-lamp, during which the suspension is protected from the UV-rays by placing a mirror over it.

The colour of the suspended particle device so obtained is homogeneous over the whole surface of the glazing panel, showing that the distance between the two sheets of glass is maintained substantially constant over substantially the whole surface of the glazing panel. The average distance between the two sheets of glass is calculated from 25 measurements, made when the glazing panel is in vertical position, at the central point of imaginary squares of 20 cm² dividing the glazing panel surface. The average distance calculated is 100 µm and the maximum deformation measured is 1 µm; this means that the distance between the two sheets of glass varies with a value of 1% of the average distance between the two sheets of glass.

The invention claimed is:

1. A glazing panel comprising two sheets of glass spaced apart from each other and sealed together along their edges, wherein a distance between the two sheets of glass is between 10 and 500 µm, wherein the glazing panel is provided with a plurality of spaced deposits consisting of an adhesive selected from the group consisting of an UV-cured adhesive, an anaerobic cured adhesive and a heat cured adhesive which are arranged between and in contact with the two sheets of glass and arranged with a distance between the deposits of between 1 and 10 cm, at least some of the deposits being attached to a surface of each glass sheet, and wherein the spaced deposits maintain the distance between the two glass sheets.

2. The glazing panel according to claim 1, wherein the spaced deposits maintain the distance between the two glass sheets substantially constant over substantially a whole surface of the glazing panel.

3. The glazing panel according to claim 1, wherein a size of the glazing panel is greater than 30×30 cm.

4. The glazing panel according to claim 1, wherein a thickness of each of the two sheets of glass is in a range of 2 to 6 mm.

5. The glazing panel according to claim 1, wherein the distance between the two sheets of glass is between 50 and 150 µm.

6. The glazing panel according to claim 1, wherein a variation of the distance between the two sheets of glass is less than 20% of an average distance between the two sheets of glass.

7. The glazing panel according to claim 6, wherein the variation of distance between the two sheets of glass is in a range of 0 to 10% of the average distance between the two sheets of glass.

8. The glazing panel according to claim 1, wherein the distance between the deposits is between 4 and 6 cm.

9. A chromogenic glazing panel according to claim 7, wherein the surface of each of the two sheets of glass facing a space between them is coated with a conductive layer and the space between the two sheets of glass comprises a suspension including suspended particles.

10. A smart window comprising a glazing panel according to claim 1, wherein a space between the two sheets of glass comprises a functional material comprising a liquid, a gel, a resin or a polymer.

11. The glazing panel according to claim 1, wherein the glazing panel is a vacuum insulating glazing panel.

12. A process for manufacturing the glazing panel according to claim 1, comprising the steps of:
    depositing part of the deposits on one face of one of the glass sheets and allowing them to dry without constraint,
    depositing the other deposits on said face,
    placing the other glass sheet over the first one and the deposits and
    sealing together both glass sheets along their edges.

13. The process for manufacturing a glazing panel according to claim 12, wherein the adhesive is a UV-cured adhesive.

14. The glazing panel according to claim 1, wherein the adhesive is a UV-cured adhesive.

15. A chromogenic panel comprising two sheets of glass spaced apart from each other and sealed together along their edges,
    wherein a distance between the two sheets of glass is between 10 and 500 µm,
    wherein the glazing panel is provided with a plurality of spaced deposits consisting of an adhesive arranged between and in contact with the two sheets of glass and arranged with a distance between the deposits of 1 and 10 cm, at least some of the deposits being attached to the surface of each glass sheet, and
    wherein the spaced deposits maintain the distance between the two glass sheets.

16. The chromogenic panel according to claim 15, wherein the spaced deposits maintain the distance between the two glass sheets substantially constant over substantially a whole surface of the glazing panel.

17. The chromogenic panel according to claim 15, wherein a size of the glazing panel is greater than 30×30 cm.

18. The chromogenic panel according to claim 15, wherein a thickness of each of the two sheets of glass is in a range of 2 to 6 mm.

19. The chromogenic panel according to claim 15, wherein a distance between the two sheets of glass is between 50 and 150 µm.

20. The chromogenic glazing panel according to claim 15, wherein a variation of the distance between the two sheets of glass is less than 20% of an average distance between the two sheets of glass.

21. The chromogenic glazing panel according to claim 19, wherein a variation of distance between the two sheets of glass is in a range of 0 to 10% of an average distance between the two sheets of glass.

22. The chromogenic glazing panel according to claim 15, wherein the distance between the deposits is between 4 and 6 cm.

23. The chromogenic glazing panel according to claim 20, wherein the surface of each of the two sheets of glass facing a space between them is coated with a conductive layer and the space between the two sheets of glass comprises a suspension including suspended particles.

24. A smart window comprising a chromogenic glazing panel according to claim 15, wherein a space between the two sheets of glass comprises a functional material comprising a liquid, a gel, a resin, or a polymer.

25. A process for manufacturing the chromogenic panel according to claim 15, comprising the steps of:
depositing part of the deposits on one face of one of the glass sheets and allowing them to dry without constraint,
depositing the other deposits on said face,
placing the other glass sheet over the first one and the deposits and
sealing together both glass sheets along their edges.

* * * * *